United States Patent
Zimmermann et al.

(10) Patent No.: US 11,386,182 B2
(45) Date of Patent: Jul. 12, 2022

(54) METHOD FOR INVOKING AN APPLICATION SERVICE VIA A BROWSER

(71) Applicant: ORANGE, Issy-les-Moulineaux (FR)

(72) Inventors: Julien Zimmermann, Colombelles (FR); Stephane Cazeaux, Authie (FR)

(73) Assignee: ORANGE, Issy-les-Moulineaux (FR)

( * ) Notice: Subject to any disclaimer, the term of this patent is extended or adjusted under 35 U.S.C. 154(b) by 211 days.

(21) Appl. No.: 16/305,633

(22) PCT Filed: May 22, 2017

(86) PCT No.: PCT/FR2017/051257
§ 371 (c)(1),
(2) Date: Nov. 29, 2018

(87) PCT Pub. No.: WO2017/207892
PCT Pub. Date: Dec. 7, 2017

(65) Prior Publication Data
US 2020/0334303 A1    Oct. 22, 2020

(30) Foreign Application Priority Data
May 31, 2016 (FR) ...................................... 1654903

(51) Int. Cl.
*G06F 16/957* (2019.01)
*G06F 16/958* (2019.01)
*G06F 9/54* (2006.01)

(52) U.S. Cl.
CPC ............ *G06F 16/957* (2019.01); *G06F 9/548* (2013.01); *G06F 16/958* (2019.01)

(58) Field of Classification Search
CPC ....... G06F 16/957; G06F 16/958; G06F 9/548
USPC ......................................................... 707/707
See application file for complete search history.

(56) References Cited

U.S. PATENT DOCUMENTS

| | | | | |
|---|---|---|---|---|
| 6,298,056 B1* | 10/2001 | Pendse | .................. | H04M 15/00 370/252 |
| 6,766,298 B1* | 7/2004 | Dodrill | ............... | H04M 3/4938 704/235 |
| 7,870,482 B2* | 1/2011 | Gnech | ................... | G06F 16/972 715/239 |
| 8,817,969 B1* | 8/2014 | Chou | ................. | G06Q 30/0203 379/201.02 |
| 2003/0126149 A1* | 7/2003 | Jung | ................. | H04M 3/42323 |
| 2004/0122951 A1* | 6/2004 | Beck | ....................... | H04L 67/02 709/227 |

(Continued)

FOREIGN PATENT DOCUMENTS

EP    2246793 A1    11/2010

OTHER PUBLICATIONS

Qiao, Xiuquan, et al. "Opening up telecom networks with a lightweight web element service cloud for ordinary users in the web 2.0 era." IEEE Communications Magazine 52.10 (2014): 127-133. (Year: 2014).*

(Continued)

*Primary Examiner* — Mohsen Almani
(74) *Attorney, Agent, or Firm* — David D. Brush; Westman, Champlin & Koehler, P.A.

(57) ABSTRACT

A method of invoking in a terminal at least one application service by a browser. The method includes: detecting at least one invocation data item in a first loaded page loaded in the browser, the data item complying at least with one invocation data type registered for the at least one service; and invoking, in the first loaded page, the at least one service from the at least one detected invocation item.

12 Claims, 6 Drawing Sheets

(56) References Cited

U.S. PATENT DOCUMENTS

| | | | | |
|---|---|---|---|---|
| 2005/0097189 A1* | 5/2005 | Kashi | ................... | H04M 7/003 709/217 |
| 2005/0111439 A1* | 5/2005 | Yarlagadda | ......... | H04M 7/1225 370/352 |
| 2010/0005426 A1* | 1/2010 | Van | ....................... | G06F 40/284 715/860 |
| 2011/0099525 A1* | 4/2011 | Krysiuk | .............. | G06F 16/9537 715/849 |
| 2015/0067807 A1* | 3/2015 | Williams | .............. | H04W 12/06 726/7 |
| 2016/0328484 A1* | 11/2016 | Temby | ................ | G06F 16/9535 |

OTHER PUBLICATIONS

Lu, Yan, Shipeng Li, and Huifeng Shen. "Virtualized screen: A third element for cloud-mobile convergence." Ieee Multimedia 18.2 (2011): 4-11. (Year: 2011).*

Weldon, Kim Andrew, System and Method for Accessing Telephony Services Via an Application Plug-In, WO 2016/011251 A1, PCT/US2015/0407 48; Jul. 16, 2015 (Jul. 16, 2015) (Year: 2015).*

International Search Report dated Sep. 13, 2017 for corresponding International Application No. PCT/FR2017/051257, filed May 22, 2017.

Written Opinion of the International Searching Authority dated Sep. 13, 2017 for corresponding International Application No. PCT/FR2017/051257, filed May 22, 2017.

Michael Jasper: "Convert <address> tage to Google Maps embed automatically with jQuery: Mike Does Web", http://www.mikedoesweb.com, Oct. 4, 2012 (Oct. 4, 2012), XP055341066, Retrieved from the Internet: URL: https://www.mikedoesweb.com/2012/convert-tag-to-google-maps-embed-automatically-with-jquery/.

English translation of the Written Opinion of the International Searching Authority dated Sep. 13, 2017 for corresponding International Application No. PCT/FR2017/051257, filed May 22, 2017.

* cited by examiner

| TY | S | MI | NOM |
|---|---|---|---|
| TY1 | S1 | URL | HOME |
| | S2 | URL+CJ | BUSINESS |
| TY2 | S3 | URL+CJ | TAXI |
| TY3 | S4 | URL | ... |

METHOD FOR INVOKING AN APPLICATION SERVICE VIA A BROWSER

CROSS-REFERENCE TO RELATED APPLICATIONS

This Application is a Section 371 National Stage Application of International Application No. PCT/FR2017/051257, filed May 22, 2017, the content of which is incorporated herein by reference in its entirety, and published as WO 2017/207892 on Dec. 7, 2017, not in English.

BACKGROUND OF THE INVENTION

The present invention lies in the general field of navigation software or "browsers", and has a preferred but non-limiting application to the field of web browsers.

It relates more particularly to using application services in a browser.

Such application services are also referred to as on-line services.

Nowadays, browsers enable their users to access application services that are provided by third parties, e.g. businesses.

The main functions of such third parties or businesses comprise hosting, managing, and maintaining software, e.g. within servers, which software serves to provide the services in question to the terminals of users.

Such application services may be accessible in browser pages, with the browsers being installed on the terminals. Access to such a service can require a user subscription and/or user identification.

By way of example, such services may consist in services available on the Internet, services for making connections, e.g. by telephone or by videophone, content translation services, messaging services, antivirus analysis services, etc.

At present, accessing on-line services by a browser presents certain difficulties. Specifically, at present, there do not exist techniques enabling one or more application or on-line services to be accessed in simple, fast, and effective manner from any page of a browser.

The present invention seeks in particular to respond to this problem, and more generally to improve access to a service from a browser.

OBJECT AND SUMMARY OF THE INVENTION

To this end, the present invention proposes a mechanism making it possible from a data type present in any page in a browser, e.g. a telephone number (contact, after-sale service, directory, etc.), to invoke an application service or an on-line service that takes this data type as input, e.g. a telephone service.

More specifically, and in a first aspect, the invention provides a method of invoking in a terminal at least one application service by a browser, the method comprising:
- a detection step for detecting an invocation data item in a first loaded page in the browser, the data item complying with an invocation data type registered for the application service; and
- an invocation step for invoking, in the first loaded page, the service from the detected invocation item.

Correspondingly, the invention provides a terminal enabling an application service to be invoked by a browser, the terminal comprising:
- a detection module for detecting an invocation data item in a first loaded page in the browser, the data item complying with an invocation data type registered for the application service, e.g. in association with an identifier of the service; and
- an invocation module for invoking, in the first loaded page, the service from the detected invocation data item.

A browser is software run in a terminal to make it possible to consult and display content coming from a network to which the terminal is connected.

In the particular circumstance of a web browser and a terminal that is connected to the Internet, the content is Internet content.

As an alternative, the terminal could be connected to an Intranet or to a private network.

The browser loads one or more pages and optionally displays them on an interface of the terminal, each of the pages comprising, in the meaning of the invention, a set of page data, which data is provided by the network.

In a particular implementation, the page data comprises:
- a hypertext markup language (HTML) description serving to structure and format pages when they are loaded into the browser;
- functions in the "Javascript" programming language that can be called in the HTML description; and
- other data, e.g. multimedia data, that can also be called in the HTML description, e.g. images for display.

A page is said to be loaded when the browser has finished interpreting the HTML description that is associated with the page.

A browser page may propose an application or on-line service, in other words a service that is accessible via the network to which the terminal is connected.

In other words, in the meaning of the invention, an application service is a service provided directly by a page of the browser and not requiring any specific software to be installed.

An application service may include various functions. For example, a telephone service may propose a call function, however it may also propose other functions, such as for example managing a list of contacts or a calendar.

An application service is characterized by the data type(s) that it is capable of processing or using, i.e. by the data that it can take as input.

In the meaning of the invention, the input data of the service is referred to as "invocation data" since it can be used to invoke the service. Invocation data types are also mentioned.

Invoking an application service corresponds to the moment when the service is made usable for a user. For example, invoking a service may correspond to the instant when the user begins to use one of its functions.

Invoking the service thus corresponds to triggering execution of that service.

Thus, the invention serves advantageously to invoke an application service in any page of the browser by using an invocation data item present in that page and of a type that complies with the data type that the application service can use.

In particular, the invention does not need software to be installed for providing the service, but only knowledge of the data type that can be used by the application or on-line service, together with detecting that data type in a page loaded in the browser.

In a particular implementation, prior to the step of detecting an invocation data item, the method includes a step of registering the invocation data type for the service invoked.

In a particular implementation, prior to the step of detecting an invocation data item, the method includes a step of receiving a first instruction defining a second page providing the service, the first instruction defining the invocation data type associated with the service.

This first instruction serves both to offer the service to the user in a page of the browser, and also to define invocation data types that can be used by the service.

This first instruction may be contained in the page data set associated with the second page for providing the service and as described above.

Advantageously, this first instruction may be sent simultaneously with the page data.

It may optionally be subjected to "standardization" among service providers, which then need merely to add this first instruction as "standardized" in this way to the page data set that is sent to the terminal in order to enable any browser performing the invention to register the invocation data types that are usable by their services.

In a particular implementation, the invocation data type is registered in a table of the terminal.

In a particular implementation, the detection step comprises:
 a step of identifying invocation data present in the first loaded page; and
 a determination step, for an identified invocation data item, of determining whether the data item complies with a registered invocation data type.

In a particular implementation, during the identification step, the invocation data is identified in response to a user command received by the browser.

Thus, by way of example, the invocation data item may be selected by the user before it is determined whether the data item complies with the invocation data type associated with the application service.

In a particular implementation, the detection step includes any one of the following:
 a step of semantically analyzing the first loaded page; and
 a step of detecting a coded marker in the first page in association with the invocation data item.

In a particular implementation, the first instruction defines a network address pointing to a third page, and the invocation step includes a step of triggering loading of the third page from the address, the method includes an execution step of executing the service in the third page.

In advantageous manner, the application service is invoked within the second page, however the service executes in a third page, with loading of that page being triggered at the time of invocation.

The way the network address is defined may be the subject of "standardization" among service providers.

Any service provider can merely add a "standardized" network address defining instruction to the page data set associated with the second page providing the service so as to enable any browser performing the invention to invoke the service in the third page, which is different from the second page.

In a particular implementation, during the detection step, the second page proposing the service is not loaded into the browser.

Advantageously, a user can invoke the application service without needing to load the page proposing the service immediately beforehand.

In a particular implementation,
 the first instruction defines an invocation function for invoking the service:
 the invocation step includes a step of invoking the function; and
 the execution step for executing the service in the third page includes executing the function.

In a particular implementation, the execution of the function causes a control unit to be displayed in the first loaded page, which control unit is accessible to a user for controlling the service while it is being executed in the third page.

Advantageously, the user can control the service in the first page without needing to access the third page executing the service.

In a particular implementation, the invocation step is performed:
 automatically in response to the step of detecting an invocation data item in the first loaded page; or
 in response to a user command.

In a particular implementation, the method includes a triggering step of triggering the provision of a notification in the first page indicating that the application service is accessible.

The user is then notified about the accessibility of the service.

In a particular implementation, during the triggering step, the browser provides the notification.

In a particular implementation, during the triggering step, the browser displays the notification in the first loaded page.

In a particular implementation, the triggering step includes a step of sending a command to a device so as to cause that device to provide the notification.

In a particular implementation, the device may consist in any of the following:
 the terminal performing the method; and
 a device that is external to the terminal.

Consequently, the notification may be provided either by the browser, or else on the terminal, but via software other than the browser, or on a device that is connected to the terminal.

In a particular implementation, the invocation data type corresponds to any one of the following:
 a telephone number;
 a postal address;
 an email address;
 multimedia data; and
 a uniform resource locator (URL).

In a particular embodiment, the various steps of the method of invoking an application service by a browser are determined by computer program instructions.

Consequently, the invention also provides a computer program on a data medium, the program being suitable for being performed by a computer, the program including instructions adapted to performing the above-mentioned method of invoking an application service by a browser.

The program may use any programming language and be in the form of source code, object code, or code intermediate between source code and object code, such as in a partially compiled form or in any other desirable form.

The invention also provides a computer readable data medium including instructions of a computer program as mentioned above.

The data medium may be any entity or device capable of storing the program. For example, the medium may include storage means such as a read only memory (ROM), e.g. a compact disk (CD) ROM, or a microelectronic circuit ROM, or indeed magnetic recording means, e.g. a floppy disk or a hard disk.

Furthermore, the data medium may be a transmissible medium such as an electrical or optical signal, which may be conveyed via an electrical or optical cable, by radio, or by other means. The program of the invention may in particular be downloaded from an Internet type network.

Alternatively, the data medium may be an integrated circuit in which the program is incorporated, the circuit being adapted to execute or to be used in the execution of the method in question.

BRIEF DESCRIPTION OF THE FIGURES

Other characteristics and advantages of the invention appear on reading the following description, which is made with reference to the accompanying drawings, in which.

DETAILED DESCRIPTION OF IMPLEMENTATIONS

Figure 1:
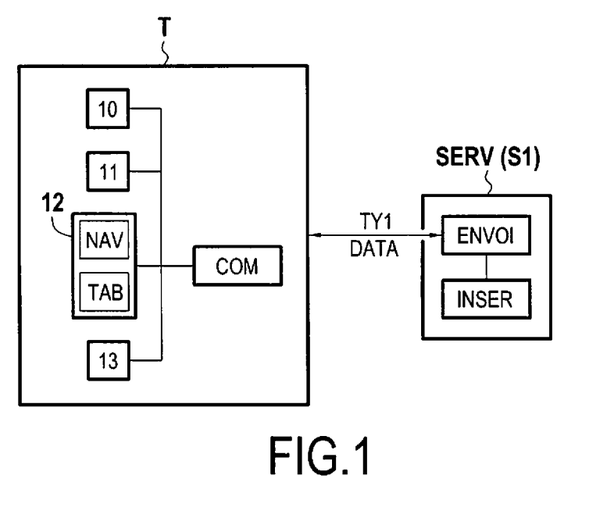
FIG. 1 shows a terminal in accordance with the invention suitable for invoking an application service and communicating with a remote server.

FIG. 1 shows a terminal T in accordance with the invention in communication with a remote server SERV providing a service S1.

The terminal T performs various steps of an application service invocation method as described with reference to FIGS. 3 to 9.

By way of example, the terminal T may comprise a computer, a telephone, a smartphone, a tablet, or any connected object.

In the presently-described embodiment, the terminal T possesses the hardware architecture of a computer.

Thus, the terminal T comprises a processor 10, a ROM type memory 11, a rewritable non-volatile memory 12 (e.g. of flash type), a random access memory (RAM) type memory 13, and a communications module COM.

The non-volatile memory 12 of the terminal T constitutes a data medium in accordance with the invention that is readable by the processor 10 and that stores a browser NAV suitable for loading one or more pages, e.g. a page providing the service S1 and having associated data DATA that is received from the remote server SERV and that is sent by a first module ENVOI of the server.

As explained above, the page data DATA associated with the page providing the service S1 may comprise:
- a hypertext markup language (HTML) description for structuring and formatting the page providing the service S1 when it is loaded in a browser;
- functions in the "Javascript" programming language that can be called in the HTML description; and
- other data, e.g. multimedia data, that can likewise be called in the HTML description, e.g. images to be displayed.

The format and the structure of the page data DATA may nevertheless vary depending on the implementation under consideration.

In addition, the page data DATA may be processed by the terminal T in order to load into the browser NAV the page providing the service S1 and also to invoke the service S1 in another page that is different from the page initially proposing the service S1, and as described below.

The non-volatile memory 12 of the terminal T also has a table TAB of content that is described with reference to FIG. 11, and further including one or more data types TY1 that the service S1 is suitable for processing.

The remote server SERV also has a second module INSER serving to insert at least one data type TY1 usable by the service S1 in the page data DATA or to send it separately.

The remote server SERV is managed by a service provider S1 and includes software (not shown) serving to provide the service S1 for the terminal T.

It should be observed that elements that are common or analogous in a plurality of figures are given the same reference signs and present characteristics that are identical or analogous, such that these common elements are generally not described again for reasons of simplicity.

Figure 2:
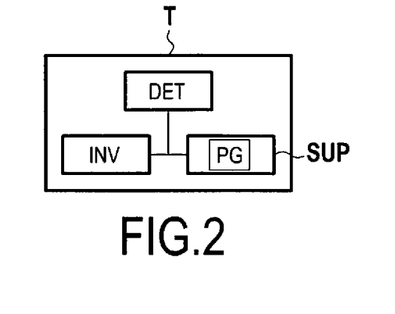
FIG. 2 shows a server in accordance with the invention.

FIG. 2 shows the terminal T of FIG. 1 in a particular embodiment. The terminal T runs a browser NAV configured to invoke an application service.

The terminal T includes a module DET configured to detect, in a first page loaded into the browser NAV, invocation data complying with a data type TY1 registered for the application service.

The terminal T also includes a module INV configured to invoke in this first loaded page, the service on the basis of the invocation data.

The terminal T also has a data medium SUP storing a program PG, the medium and the program both being in accordance with the invention, the program PG including instructions for executing steps of a method in accordance with the invention for invoking an application service, with its steps being described in detail with reference to FIGS. 3 to 9.

In a particular embodiment, the terminal T also has a module ENR (not shown) for registering the invocation data type associated with the service, e.g. in the table TAB.

Figure 3:
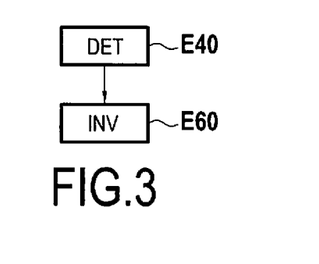
FIG. 3 shows the main steps of an invocation method in accordance with the invention.

FIG. 3 shows a general method in accordance with the invention for invoking an application service S1.

The method may be performed by a terminal T as described with reference to FIG. 1 or 2.

By way of example, the application service S1 may consist in a service that is available on the Internet, a connection-making service, e.g. such as a telephone or videophone service, a browsing service, etc.

The method has a first step E40 of detecting, in a first page (referenced herein TAB2) loaded in the browser NAV, invocation data DN in accordance with an invocation data type TY1 registered in association with the service S1.

This invocation data type TY1 corresponds to the type of data that can be used by the service S1.

Figure 12:
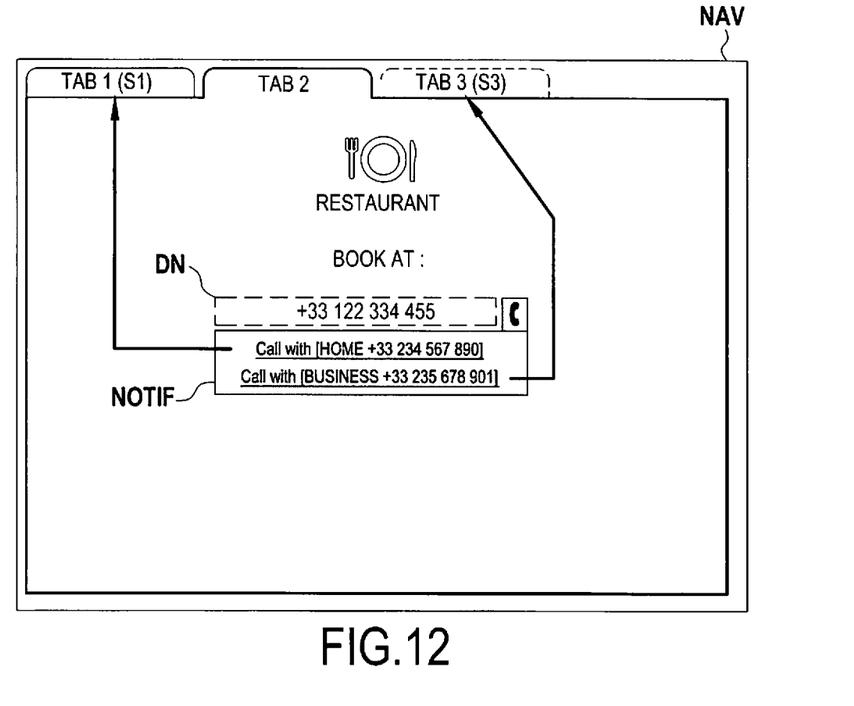

By way of example, and with reference to FIG. 12, a first page TAB2 is loaded into the browser NAV and displays the Internet page of a restaurant.

In this implementation, the invocation data DN corresponds to the telephone number of the restaurant that can be seen in the loaded page. The invocation data DN is contained in the data associated with the loaded page TAB2.

More precisely, this invocation data DN may be contained in the HTML description associated with the loaded page TAB2 and received from the remote server SERV.

The general HTML description of the first loaded page TAB2 shown in FIG. 12 may present structure of the following type (line numbers added):

1 <html>
2 <image>'http://www.example/image/assiette.png'</image>
3 RESTAURANT
4 BOOK AT:
5 <phone>+33 122 333 455</phone>
6 </html>

In this example, the data DN corresponding to the telephone number is detectable in line 5 of the HTML description, between the tags <phone> and </phone>, these tags also indicating in this example explicitly the data type of TY1 in use ("phone" corresponding to the "telephone" data type).

This invocation data type TY1 is registered, e.g. in the table TAB stored in the terminal T, in association with an identifier of the service S1. An example table TAB is shown more specifically in FIG. 10.

Figure 10:
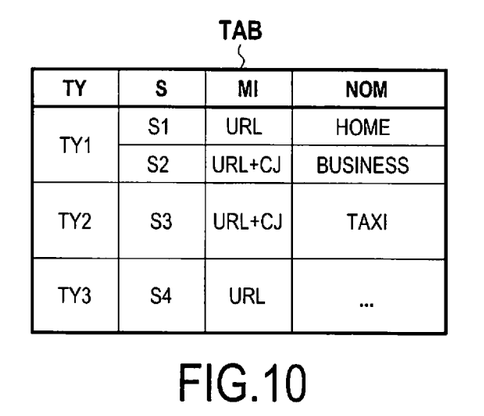
FIG. 10 shows a table in which invocation types associated with services are registered.

This invocation data type TY1 may also be associated in the table TAB with an identifier HOME serving to distinguish it from another data type or with the same data type but associated with another service.

Finally, this invocation data type TY1 may be associated in the table TAB with data (URL in this example) defining the method of invocation MI performed by the browser NAV to invoke the service S1.

In this implementation, the method of invocation corresponds to the so-called "URL" method that is described in detail below.

The detection step E40 is followed by an invocation step E60 performed in the first loaded page TAB2 to invoke the service S1 from the invocation data DN and corresponding, in the presently-described implementation, to the telephone number "+33 122 334 455".

Thus, by way of example, the service S1 proposes a connection-making service such as a telephone service, with the detected invocation data DN corresponding to a telephone number that can be used as an input variable for the telephone service S1.

Figure 13:
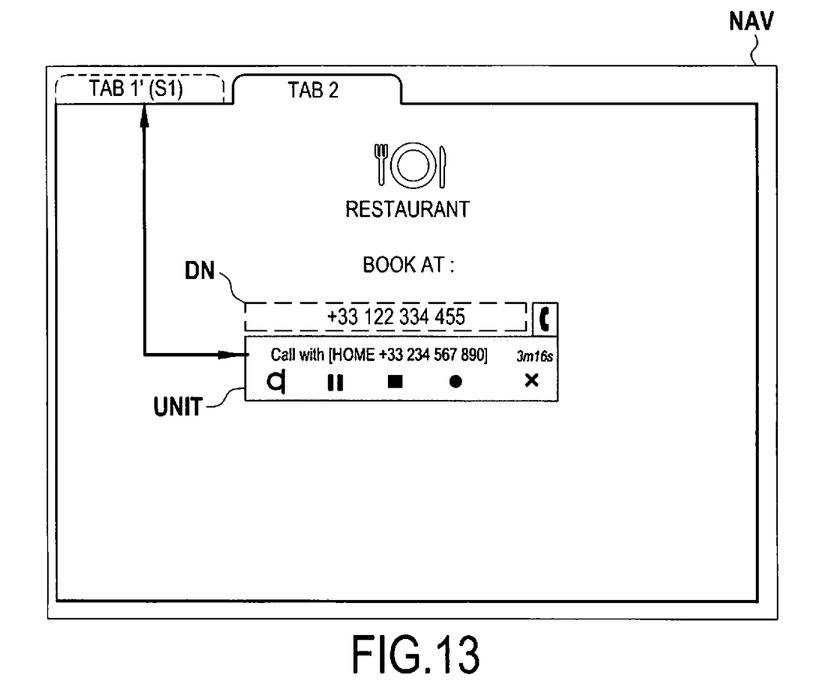

This service is then invoked in the first loaded page TAB2, e.g. as a result of user action, and is then potentially controllable in the same loaded page TAB2, e.g. by means of a control unit UNIT, as shown with reference to FIG. 13.

In this implementation, a user of the terminal T can act directly on the first loaded page TAB2 of the browser NAV corresponding to the site of the restaurant in order to access the telephone service S1 so as to call the restaurant having its number displayed in this first loaded page TAB2.

In this implementation, invoking the service S1 corresponds by way of example to launching the "call" function of the service, for the purpose of calling a number.

Figure 14:
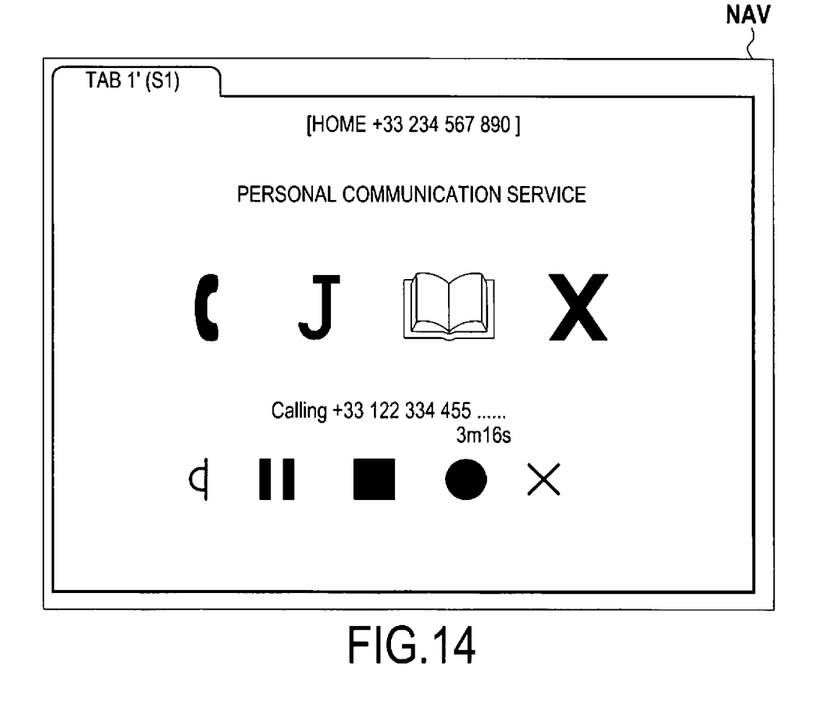

The invoked service S1 is executed in a third page TAB1' that is loaded at the time of invocation and that is shown with reference to FIG. 14.

In this example, the page TAB1' executes the "call" function of the telephone service S1.

This page TAB1' may consist in updating the previously loaded page TAB1 that proposes the service S1.

In a variant, the page TAB1 proposing the service S1 is not loaded initially, and the loading of this page TAB1' is triggered in the browser NAV at the time of invocation, and therefore does not constitute updating.

When a control unit UNIT for controlling the service and added by the browser NAV is displayed in the first page TAB2, the user can nevertheless consult this third page TAB1' if the user seeks to use functions of the service that are not available via the control unit UNIT, e.g. consulting the user's own address book or list of contacts.

In this implementation, the page TAB1' executing the service S1 and the page TAB2 enabling the service S1 to be controlled interact, in a manner advantageous for the user, who can decide to remain on the first page TAB2, or else to consult the other page TAB1'.

In a particular implementation, invoking the service S1 triggers a foreground display in the browser NAV of the third page TAB1' executing the service.

In a variant, invocation of the service S1 triggers only loading of the third page TAB1', while the first loaded page TAB2 corresponding to the restaurant site remains in the foreground display, with the third page TAB1' being loaded into another (hidden) tab of the browser NAV, for example.

In a particular implementation, the method of invoking an application service by a browser includes a first step E20 (not shown in FIG. 3), this step E20 serving, prior to the detection step E40, to register the invocation data type(s) TY1 associated with the service S1 that is to be invoked.

By way of example, the invocation data type(s) is/are registered with an identifier of the service S1.

The terminal T may perform this registration E20 in a table TAB, as shown in FIG. 10.

Figures 4, 5:
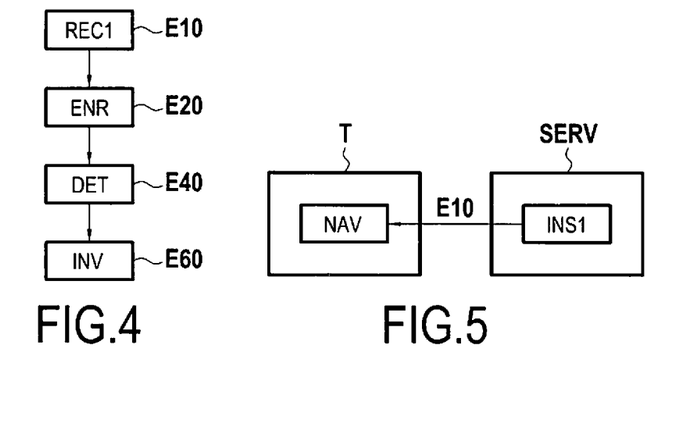
FIG. 4 shows a particular implementation of a method according to the invention for invoking application services.
FIG. 5 is a diagrammatic view of the step of receiving a first instruction, this step being included in a method in accordance with the invention.

FIG. 4 shows the steps of a method of invoking an application service S1 by a browser NAV in a particular implementation of the invention.

This invocation method may be performed in a terminal T as described with reference to FIGS. 1 and 2.

This method reproduces the steps E20, E40, and E60 of the method as described above.

In this implementation, the method of invoking an application service S1 includes a step E10 prior to the registration step E20 or to the detection step E40, this step E10 serving to receive a first instruction INS1 defining a second page TAB1 providing the service S1, this instruction INS1 defining the invocation data type TY1 associated with the service S1.

In this implementation, and with reference to FIG. 5, during step E10, the terminal T receives the instruction INS1 from the remote server SERV, and executes this instruction in the browser NAV, this execution serving in particular to register the invocation data type TY1 in the table TAB during the registration step E20.

In a particular implementation, this first instruction INS1 corresponds more widely to a set of page data DATA associated with the page TAB1 proposing the service S1.

In a particular implementation, this first instruction INS1 corresponds to the HTML description of the page TAB1 defining the service S1, this HTML description also being capable of calling Javascript language functions and possibly also other data, e.g. multimedia data.

Figure 11:
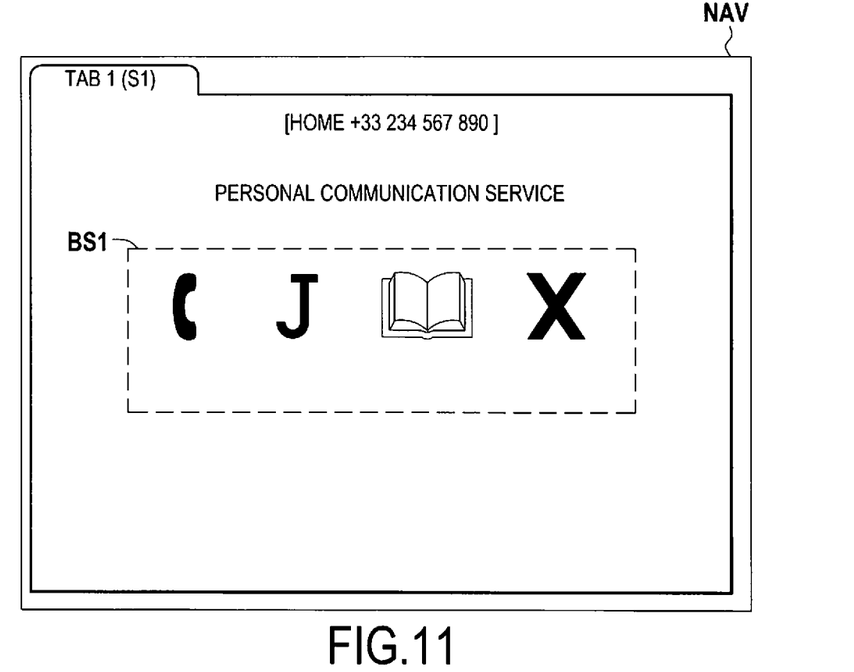
FIGS. 11 to 17 show pages loaded in a browser.

In a particular implementation, and with reference to FIG. 11, the browser NAV, on receiving the instruction INS1, executes and loads correspondingly the service S1 in a second page TAB1, which service corresponds in this example to a telephone service for calling a correspondent from the number [HOME +33 234 567 890], e.g. the user's personal telephone number, by calling any telephone number that is taken as input data for the service.

The service S1 presents certain functions (calling, consulting a list of contacts, hanging up, . . . ) that can be used, e.g. by clicking on graphics objects BS1.

In parallel with loading this page TAB1, a Javascript code element contained in the page data associated with the page TAB1 can be executed, and serves, amongst other things, to register the invocation data type TY1 associated with the service S1 in the table TAB, specifically in this example the "telephone number" data type.

This first instruction INS1 thus serves to define the invocation data type TY1 that can be used by the service S1. In a particular example, a plurality of invocation data types TY1 that can be used by the service S1 are specified in the first instruction INS1.

In a particular implementation, the HTML description of the page TAB1 providing the service S1 calls a Javascript code element that might possibly be standardized as explained above.

This Javascript code is contained in the page data DATA associated with the page TAB1 and provided by the remote server SERV.

Executing this code element enables the browser NAV to register the invocation data type TY1 in the terminal T, e.g. in the table TAB.

Executing this code element also serves to provide the browser with data enabling it to understand that the service S1 associated with the invocation data type TY1 can be invoked and what method can be used to invoke it.

For example, this standardized Javascript code element may be the following: RegisterDataService(TYn, URL, null), for a so-called "URL" invocation method (URL in the table TAB of FIG. 10); or a RegisterDataService(TYn, URL, function( )), for a so-called "callback Javascript" invocation method (URL+CJ in the table TAB of FIG. 10).

Executing this code element makes it possible to register in the table TAB:
   the invocation data type TYn;
   a network address URL, e.g. specifying a page proposing the service S1 or a page proposing a particular function of the service; and
   for a callback Javascript invocation method, a "function" function that can be invoked during the service invocation step (E60);
these various elements being registered in associated manner, e.g. in a row of the table TAB associated with an identifier NOM.

In the particular circumstance of S1 being telephone service, this code element could then be written in the form: RegisterDataService(TY1, http://communicationservice/number, null) (for the URL invocation method) or RegisterDataService(TY1, http://communicationservice/number, "Createcall( )") (for the callback Javascript invocation method).

In this particular implementation, the browser executing this code element registers the invocation data type TY1 corresponding to the telephone number type in the table TAB during step E20, together with the network address http://communicationservice/number that points to a page, e.g. a page proposing the function of calling the service S1.

In a variant, it could correspond to the network address pointing to the page TAB1 proposing the service S1.

In a particular implementation, during the detection step E40, the page pointed to by the network address http://communicationservice/number is loaded in the browser NAV.

In the particular situation of the URL method, during the invocation step E60, the browser NAV can add (or concatenate) data DN (in this example the telephone number of the restaurant +33122334455) that has been detected in the first page TAB2 at the URL network address http://communicationservice/number, e.g. in order to construct a new network address http://communicationservice/number/+33122334455, pointing to the third page TAB1' that the browser can then load.

The page TAB1' may correspond to updating the page pointed to by the address http://communicationservice/number if that page is already loaded in the browser.

In a variant, the page pointed to by the address http://communicationservice/number is not loaded initially, and loading of the page TAB1' into the browser NAV is triggered at the time of the invocation step, and therefore does not constitute updating.

This third page TAB1' executes the telephone service and is shown in FIG. 14.

In the particular situation of the callback Javascript method, the browser registers, in addition to the data type and the network address, the character string "Createcall( )" corresponding to a Javascript language function that is invoked while invoking the service.

In this particular implementation, during the invocation step E60, the browser NAV loads the page pointed to by the network address http://communicationservice/number and then invokes the Javascript function "Createcall( )", triggering loading of the third page TAB1' shown in FIG. 14 that executes the service.

In a variant, the page pointed to by the network address http://communicationservice/number is loaded into the browser during the detection step E40, and during the step E60, the browser NAV invokes the "Createcall( )" function in this page without loading it.

In other words, this network address makes it possible to inform the browser of the page in which to invoke the Javascript function in order to invoke the service and thus in order to load the page TAB1' that executes the service.

In a particular implementation, the code element also includes information specifying whether the third loaded page TAB1' is to be displayed in the foreground in the browser or whether it is merely to be loaded, e.g. in a non-displayed tab of the browser NAV, as shown in FIG. 13.

The "Createcall( )" function may be defined as follows (lines numbers added):

| 1 | function Createcall(number, displayZone) |
|---|---|
| 2 | { |
| 3 | . . . |
| 4 | initiateCall(number); |
| 5 | displayGUI(displayZone); |
| 6 | playTones( ); |
| 7 | . . . |
| 8 | } |

As input arguments, this function takes a telephone number type variable "number", possibly together with a variable associated with a browser page "displayZone".

Advantageously, the signature of this function, i.e. the number of input arguments and their types (character string, integer, etc.) may form the subject matter of standardization by service providers.

In this particular example, the "Createcall" function comprises:
   in line 4, an initiateCall(number) function serving to initiate a telephone call to the telephone number "number" given as an argument:
   in line 5, a displayGUI(displayZone) function serving to display a graphics element, e.g. a box (or "iframe" in HTML language) in the page defined by "display-Zone", e.g. the first loaded page TAB2;

in line 6, a playTones( )function for playing an alarm; etc. . . . .

With a callback Javascript invocation method, this function is invoked during the step E60 of invoking the service S1, and takes as its argument (for the "number" variable) the detected data DN corresponding in this implementation to the telephone number of the restaurant.

In this implementation, executing this function serves to execute the service S1.

Figure 6:
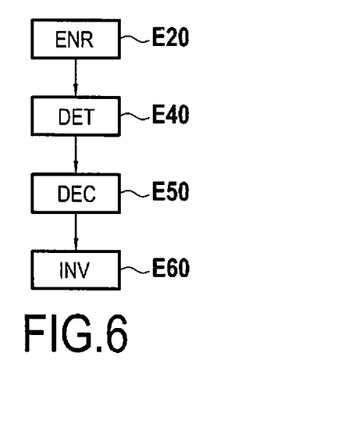
FIG. 6 shows a particular implementation of a method in accordance with the invention.

FIG. 6 shows a method of invoking an application service S1 via the browser NAV in a particular implementation of the invention.

This method is implemented by a terminal T, as shown with reference to FIGS. 1 and 2.

The method repeats the general steps E20, E40, and E60 as described above with reference to FIGS. 3 to 5.

In this implementation, the method also has a step E50 of triggering the provision of a notification NOTIF indicating the accessibility of the service S1 in the first loaded page TAB2.

In a particular implementation, during this triggering step, it is the browser NAV that provides the notification NOTIF and that displays it in the first loaded page TAB2.

For example, with reference to FIG. 12, the browser NAV displays the notification NOTIF in the page TAB2 loaded in the browser NAV and pointing to the telephone number DN that was detected in step E40, with this notification NOTIF having a first line "Call with [HOME +33 234 567 890]".

This first line indicates that the telephone service S1 is accessible and that its page TAB1 has previously been loaded at least once.

In this implementation, it also makes it possible to invoke the telephone service S1 while taking the data DN as input, e.g. by clicking on the line "Call with [HOME +33 234 567 890]", and thus call the restaurant.

Figure 17:
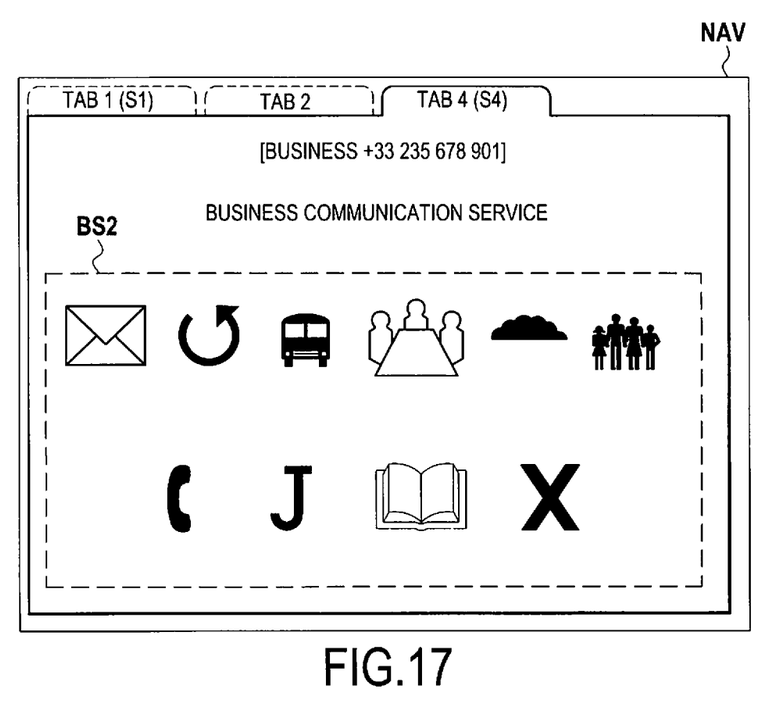

This notification NOTIF may also include a second line "Call with [BUSINESS +33 235 678 901]", indicating the accessibility of a second service S4 provided for example by a page TAB4, as shown in FIG. 17.

This second service also includes various functions that are accessible, e.g. by clicking on the graphics elements BS2. These functions also take as input a telephone number corresponding to the invocation data DN, but they correspond to a second telephone service, e.g. from a telephone number that is different, such as the user's business telephone number.

In a variant, the triggering step E50 includes a step of sending a command COMM to a device, this causing the device to provide the notification NOTIF.

In a particular implementation, the device is the terminal T performing the invocation method, and the command COMM serves, by way of example, to call software that has been pre-stored in the terminal T, the software enabling the terminal T to provide the notification NOTIF.

For example, the software providing the notification NOTIF may display a "pop-up" window on an interface of the terminal T and thus inform the user of the terminal T that the service is accessible.

Figure 7:
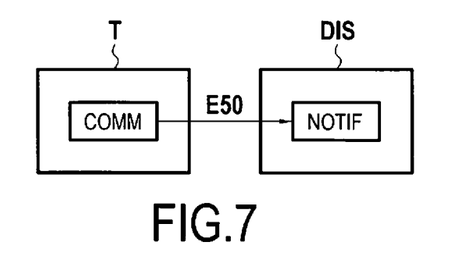
FIG. 7 is a diagrammatic view of the step of providing a notification, this step being included in a method in accordance with the invention.

In a variant, the command COMM is sent to a device DIS that is external to the terminal T, as shown with reference to FIG. 7.

This device DIS may consist in a second terminal, in a peripheral component of the terminal T, such as a loudspeaker, or indeed in a connected object.

The device DIS receiving the command COMM then provides the notification NOTIF to the user indicating that the service S1 is accessible, e.g. in the form of a message containing multimedia data, e.g. a text, an image, or a video.

It should also be observed that various forms of notification (graphical, audio, etc.) are possible in step E50 for indicating the accessibility of the service S1 in the first loaded page TAB2.

Figure 8:
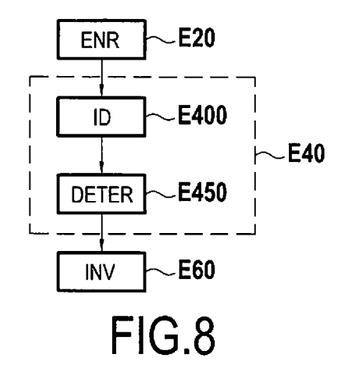
FIGS. 8 and 9 show two particular implementations of a method in accordance with the invention.

FIG. 8 shows a method of invoking an application service S1 by a browser NAV in a particular implementation of the invention.

This method may be implemented by the terminal T as described with reference to FIG. 1 or 2.

The method repeats the general steps E20, E40, and E60, as described above with reference to FIGS. 3 to 6.

In this implementation, the step E40 of detecting invocation data DN in a first loaded page TAB2 in accordance with the invocation data type TY1 itself comprises two substeps E400 and E450.

In the step E400, one or more items of invocation data DN present in the first loaded page TAB2 are identified.

For example, with reference to FIG. 13, the invocation data DN corresponding to the telephone number +33 122 334 455 of the restaurant may be identified by the browser NAV, e.g. in the HTML description of this loaded page TAB2.

The step E400 is followed by a determination step E450 for determining, for each identified item of identification data DN, whether that item of data complies with the data type TY1.

In a particular implementation, the data type TY1 corresponds to a telephone number and it can be used by a telephone service S1.

In step E450, the browser then determines whether the loaded page TAB2 includes an item of data in compliance with the "telephone number" data type, e.g. by analyzing the HTML description associated with the page TAB2, as described in detail above.

In a particular implementation, during the identification step E400, each item of invocation data DN is identified in response to a user command received by the browser NAV.

For example, the user may click on or select the item of invocation data DN by using a pointer (or any other appropriate means) in order to cause the browser NAV to act in step E450 to determine whether the selected data complies with the data type TY1.

In a variant, this item of invocation data DN is identified automatically in step E400, e.g. by automatically analyzing the HTML description of the page.

In a particular implementation, the detection step E40 may consist in a step of semantically analyzing the first loaded page TAB2.

In this implementation, and by way of example, the browser NAV may scan the HTML description associated with the loaded page TAB2 and detect text of format corresponding to a certain type of invocation.

In the HTML description (lines 1-6) described in detail above with respect to the first loaded page TAB2 shown in FIG. 12, the browser NAV can detect on line 5 the invocation data DN "+33 122 334 455" by scanning through the HTML description.

For example, the browser NAV may detect that a string of characters beginning with the character "+" and then followed by a set of ten digits corresponds to an item of invocation data DN that complies with the invocation data type corresponding to a telephone number.

In a variant, detection step E40 corresponds to a step of detecting a coded marker (e.g. a tag) in the first loaded page TAB2 in association with the invocation data DN.

In a particular implementation, this coded marker may correspond to one or more tags known as "URL Request Identifier" inserted in the HTML description associated with the loaded page TAB2.

In the presently-described implementation, two tags are placed respectively before and after the invocation data item in order to mark it as being of a predefined type.

The content of the tag thus specifies a previously prepared invocation data type, e.g. as defined and standardized on the Internet site http://schema.org.

By way of example, in the HTML code associated with the table TAB2 as described in detail above, the tags <phone> and </phone> serve to indicate that the data lying between those tags corresponds to a telephone number.

Figure 9:
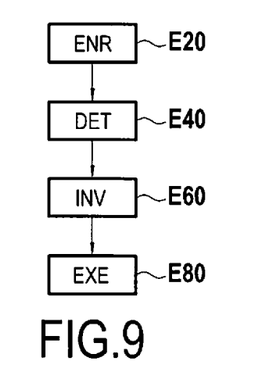

FIG. 9 shows a method of invoking an application service S1 by a browser NAV in a particular implementation of the invention.

This method may be implemented by a terminal T as shown in FIGS. 1 and 2.

This method repeats the general steps E20, E40, and E60 as described with reference to FIGS. 3 to 6 and also FIG. 8.

This method includes a step E80 of executing the service S1 in the third page TAB1'.

In the implementation in which the invocation method used is the callback Javascript method, the service in the page TAB1' may be executed simultaneously with displaying a control unit UNIT in the first loaded page TAB2 where it is accessible to a user for controlling the invoked service S1.

This implementation corresponds to a callback Javascript method as mentioned above, although other invocation methods are possible.

In a particular implementation, the browser NAV then acts during the invocation step E60 to display a box (or "iframe" in HTML language) in the loaded page TAB2, with the contents of the box being defined by the Javascript function "function" included in the invoked instruction INS1, as explained above.

With reference to FIG. 13, the browser NAV displays a control unit UNIT in the first loaded page TAB2 enabling the telephone service S1 to be controlled and taking as input the invocation data item DN corresponding to a telephone number.

By way of example, using this control unit UNIT, a user can act on the telephone conversation implemented by the service S1 in the loaded page TAB2, e.g. causing the conversation to be paused, recorded, hung up, etc.

In a variant, invoking the service S1 causes the page TAB1' to be displayed in the foreground, which page, in step E80, executes the service S1 then made available to the user, and without displaying the control unit in the page TAB2.

This implementation corresponds to a URL invocation method.

Figure 15:
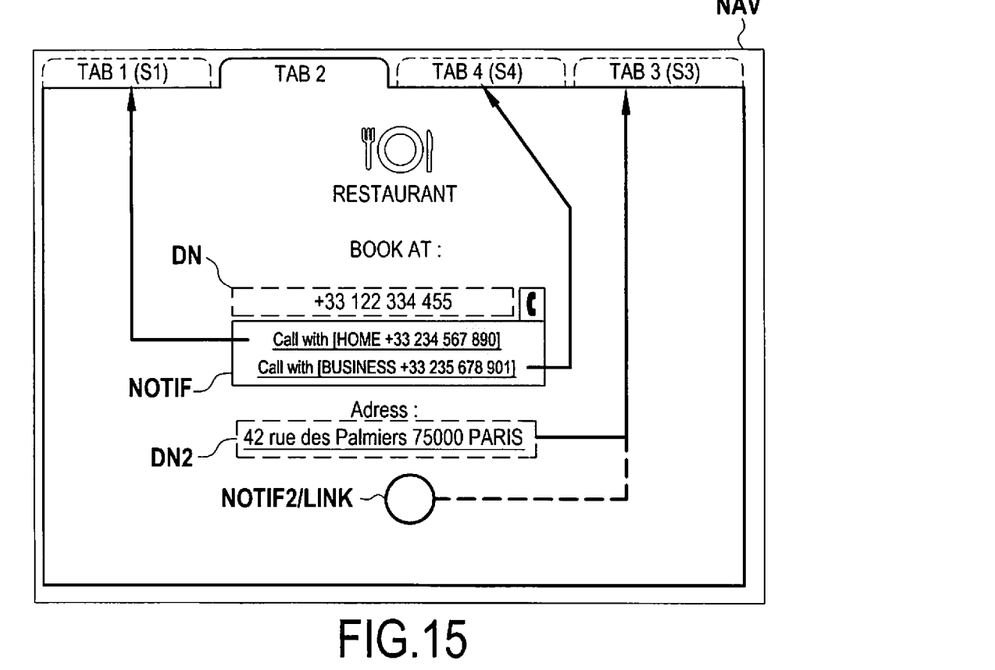

For example, in this particular implementation and with reference to FIG. 15, the browser NAV displays a loaded page TAB2 corresponding to the Internet page of a restaurant and including an item of invocation data DN2 corresponding to the address of the restaurant, specifically "42 rue des Palmiers 75000 PARIS".

In step E40, the browser NAV detects in this first loaded page TAB2 the invocation data DN2 complying with the "address" invocation data type TY2.

For example, the browser NAV detects this data in the following HTML description used for displaying the address in the browser: <address<42 rue de Palmiers 75000 PARIS </address>.

The browser NAV can detect this data by semantic analysis identifying a character string constituting an address, or indeed by detecting one or more coded markers representing a particular type of data, specifically <address> and </address>.

These particular markers between tags have been standardized and correspond to the markers present on the Internet site http://schema.org.

In a variant, other markers enable the invocation data to be detected.

In a particular implementation, this identification step E40 is followed by the step E50 of displaying a notification NOTIF2, in this example representing a terrestrial globe and indicating that a service S3 is accessible, e.g. a taxi service.

Figure 16:
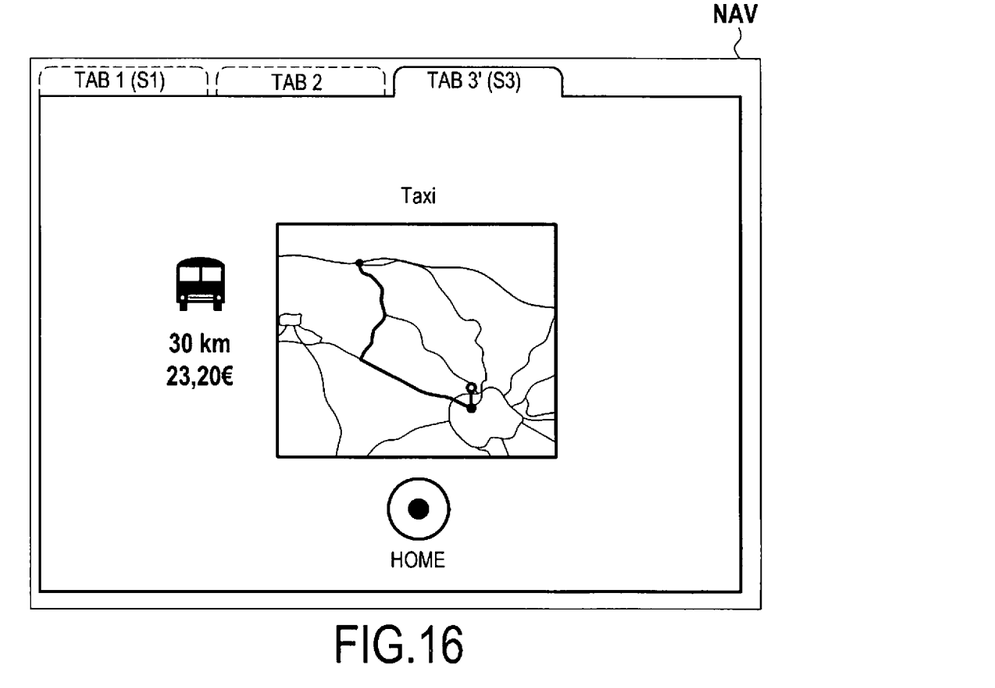

In step E60, the user can click directly on the displayed address if the notification NOTIF2 is not displayed, or in a variant on the notification NOTIF2, then invoking the service S3 and causing a third page TAB3' to be loaded, with reference to FIG. 16.

This third page TAB3' proposes a corresponding service S3, in this example a taxi service.

In another implementation, the graphics element LINK represents a terrestrial globe pointing towards a URL address.

For example, the URL address may have the following HTML form:

href="http://location.map.test?42+rue+des+Palmiers+ 75000+PARIS+France&service=JaeroiuyAZerb- uiroezeru"><img src="Map_Pin.png" border="1" width="50" height="50"

This HTML description makes it possible both to display the image "Map_Pin.png" and also to point to a geolocating service http://location.map.test serving in this example to locate the restaurant on the basis of its address.

In this implementation, the invocation data corresponds to the address "42+rue+des+Palmiers+75000+PARIS+France" and may be detected by the browser NAV in the detection step E40 by analyzing the URL address.

This data can then be used as input data to any service (e.g. the taxi service S3) that is capable of using input of the invocation data type "postal address".

This service can then be invoked in response to a user action, e.g. clicking on a notification (not shown).

FIG. 10 shows a table TAB in which the invocation data types TY were registered in step E20 in association with the application service(s) that can be invoked by the browser NAV.

In the table TAB, a first invocation data type TY1 corresponding to the "telephone number" data type is associated with two application services S1 and S2.

By way of example, both of these services propose telephone services of the kind shown with reference to FIGS. 11 and 17.

For each of these services, there may be an associated method of invocation MI.

The method of invocation MI may be a so-called URL method of invocation or a so-called callback Javascript URL+CJ method of invocation, as described above.

Data linked to the method MI, such as a network address or a function to be called in order to execute the service may be stored in the method.

Each service S is associated with an identifier NOM serving to distinguish it from other services.

For example, the service S1 for processing a data type TY1 corresponding to a telephone number and proposing a telephone service on the basis of a personal telephone number has the identifier HOME.

The service S2 has the identifier BUSINESS and corresponds to a telephone service for calling a correspondent from a professional telephone number.

The invocation data type TY2 associated with a service S3 corresponds to a "postal address" invocation data type, and the service S3 may correspond for example to a taxi service. By way of example, this service S3 may be named TAXI.

In a particular implementation, the table TAB is updated each time a user uses a service by using the browser NAV to load a page proposing the service.

The line corresponding to a service loaded in the browser NAV can be deleted when the page is closed, or in a variant it may be retained in the table TAB, even if the user closes the page.

By way of example, an invocation data type may correspond to any of the following:
a telephone number;
a postal address;
an email address;
multimedia data; and
a URL.

Thus, in an implementation that is not shown, the invocation data detected in the loaded page corresponds to an image, and the service that can be invoked may correspond to an image processing service, for example.

The invention claimed is:

1. A method of invoking in a terminal at least one application service by a browser, said method comprising the following steps performed by the terminal:
   a reception step of receiving from a server a first instruction defining at least one second page in the browser providing said at least one service, said first instruction defining at least one invocation data type and at least one network address pointing to at least one third page;
   a registration step of registering in a table stored in the terminal said at least one invocation data type and said at least one network address pointing to said at least one third page;
   after the reception and the registration steps, a detection step of detecting at least one invocation data item in a first loaded page in said browser, the data item complying at least with the one invocation data type registered for said at least one service;
   an invocation step of invoking, in said first loaded page, said at least one service from said at least one detected invocation data item; said invocation step including a step of triggering loading of said at least one third page from said at least one network address, and
   an execution step of executing said at least one service in at least one third page in the browser, said execution step including:
   executing an invocation function for invoking said at least one service,
   displaying a control unit in said first loaded page, said displaying being caused by
      said execution of said invocation function, and wherein the control unit is
   accessible to a user for controlling said at least one service while said at
   least one service is being executed in said third page.

2. The method according to claim 1, wherein said detection step comprises:
   an identification step of identifying at least one invocation data item present in said first loaded page; and
   a determination step of determining, for at least one said identified invocation data item, whether said data item complies with said at least one invocation data type.

3. The method according to claim 1, wherein said detection step includes at least one of the following:
   a step of semantically analyzing said first loaded page; and
   a step of detecting a coded marker in said first page in association with said at least one invocation data item.

4. The method according to claim 1, wherein, during said detection step, said at least one second page is not loaded in said browser.

5. The method according to claim 1, wherein:
   said first instruction defines the invocation function for invoking said at least one service:
   said invocation step includes a step of invoking said invocation function.

6. The method according to claim 1, including a provision triggering step of triggering a provision of at least one notification indicating accessibility of said at least one service in said first loaded page.

7. The method according to claim 6, wherein during said provision triggering step, said browser provides said at least one notification and displays the notification in said first loaded page.

8. The method according to claim 7, wherein said provision triggering step includes a step of sending a command to at least one device to cause said device to provide said notification.

9. The method according to claim 1, wherein the invocation step is performed automatically in response to the step of detecting at least one invocation data item in the first loaded page.

10. The method according to claim 1, wherein the invocation step comprises concatenating data detected in the first page to the network address in order to create a new network address.

11. A non-transitory computer readable data medium storing a computer program including instructions for executing a method of invoking in a terminal at least one application service by a browser, when the instructions are executed by a processor of the terminal, wherein said method comprises the following steps performed by the terminal:
   receiving from a server a first instruction defining at least one second page in the browser providing said at least one service, said first instruction defining at least one invocation data type and at least one network address pointing to at least one third page;
   registering in a table stored in the terminal said at least one invocation data type and said at least one network address pointing to said at least one third page;
   after receiving the first instruction, detecting at least one invocation data item in a first loaded page in said browser, the data item complying at least with one invocation data type registered for said at least one service;
   invoking, in said first loaded page, said at least one service from said at least one detected invocation item, said invoking including a step of triggering loading of said at least one third page from said at least one network address; and executing said at least one service in at least one third page in the browser, said executing including:

executing an invocation function for invoking said at least one service, displaying a control unit in said first loaded page, said displaying being caused by said execution of said invocation function, and wherein the control unit is accessible to a user for controlling said at least one service while said at least one service is being executed in said third page.

12. A terminal enabling at least one application service to be invoked by a browser, said terminal comprising:

a processor; and a non-transitory computer-readable medium comprising instructions stored thereon, which when executed by the processor configure the terminal to:

receive from a server a first instruction defining at least one second page in the browser providing said at least one service, said first instruction defining at least one invocation data type and at least one network address pointing to at least one third page;

register in a table stored in the terminal said at least one invocation data type and said at least one network address pointing to said at least one third page;

after receiving the first instructions, detect at least one invocation data item in a first loaded page in said browser, said data item complying with said at least one invocation data type registered for said at least one application service;

invoke, in said first loaded page, said at least one service from said at least one detected invocation data item, said invoking including a step of triggering loading of said at least one third page from said at least one network address; and executing said at least one service in at least one third page in the browser, said executing including:

executing an invocation function for invoking said at least one service, displaying a control unit in said first loaded page, said displaying being caused by said execution of said invocation function, and wherein the control unit is accessible to a user for controlling said at least one service while said at least one service is being executed in said third page.

* * * * *